US00RE38855E

(19) United States
(12) Reissued Patent
Cox et al.

(10) Patent Number: US RE38,855 E
(45) Date of Reissued Patent: Oct. 25, 2005

(54) CENTRIFUGAL SEPARATOR WITH ONE OR MORE INTERNAL CONTAMINANT BARRIERS

(75) Inventors: Ian M. Cox, Yeovil (GB); Andrew L. Samways, Dorchester (GB)

(73) Assignee: Filterwerk Mann & Hummel GmbH, Ludwigsburg (DE)

(21) Appl. No.: 10/151,020

(22) PCT Filed: Feb. 11, 1998

(86) PCT No.: PCT/GB98/00428

§ 371 (c)(1),
(2), (4) Date: Aug. 19, 1999

(87) PCT Pub. No.: WO98/36846

PCT Pub. Date: Aug. 27, 1998

Related U.S. Patent Documents

Reissue of:
(64) Patent No.: 6,234,949
Issued: May 22, 2001
Appl. No.: 09/367,688
Filed: Aug. 19, 1999

(30) Foreign Application Priority Data

Feb. 21, 1997 (GB) ..... 9703684

(51) Int. Cl.[7] ..... B04B 7/12; B04B 9/06
(52) U.S. Cl. ..... 494/49; 494/67
(58) Field of Search ..... 494/24, 36, 43, 494/49, 64, 65, 67, 84, 901; 210/168, 171, 232, 360.1, 380.1, 416.5; 184/6.24

(56) References Cited

U.S. PATENT DOCUMENTS

| | | | |
|---|---|---|---|
| 3,432,091 A | | 3/1969 | Beazley |
| 3,784,092 A | | 1/1974 | Gibson |
| 4,284,504 A | | 8/1981 | Alexander et al. |
| 4,346,009 A | | 8/1982 | Alexander et al. |
| 5,683,342 A | | 11/1997 | McNair |
| 6,196,962 B1 | * | 3/2001 | Purvey et al. |

FOREIGN PATENT DOCUMENTS

| | | |
|---|---|---|
| DE | 11 51 222 | 7/1963 |
| DE | 19 19 976 | 1/1971 |
| EP | 0 193 000 | 9/1986 |
| GB | 278161 | 10/1927 |
| GB | 757538 | 9/1956 |
| GB | 1089355 | 11/1967 |
| SU | 633609 | 11/1978 |
| WO | 99/11380 | 3/1999 |

* cited by examiner

*Primary Examiner*—Charles E. Cooley
(74) *Attorney, Agent, or Firm*—Crowell & Moring LLP

(57) ABSTRACT

A centrifugal separtor for non-cohesive particulates, such as are found in transmission oils and hydraulic liquids, rather than the cohesive combustion products found within internal combustion engine lubricants, consists of a housing enclosing a vertical spindle on which spins a liquid reaction driven rotor container. The container is divided internally by inwardly extending partition wall into separate outflow chambers. Non-cohesive particulates which separate from the liquid, and are held against the peripheral side wall by centrigual force during rotation, slump therefrom in the absence of rotation and risk forming a slurry that gets carried to the outflow chamber. An upwardly extending, outwardly inclined barrier wall forms a contaminant retention region with a restricted neck defined by the separation of the barrier wall edge from the side wall, that permits deposits on the barrier wall to carry to the peripheral side wall and spread across it during rotation, and does not interfere with slumping absent rotation and inhibits the slumped material from being washed into the outflow before rotation recommences.

42 Claims, 6 Drawing Sheets

500
573
$24_2$
550
540
$24_1$
663
661
650
141
640
600
$35_1$
473
450
466
468
464
470
400
472
462
467
36
463
471
465
461
469
143
440
141
144
35
39
142

CENTRIFUGAL SEPARATOR WITH ONE OR MORE INTERNAL CONTAMINANT BARRIERS

Matter enclosed in heavy brackets [ ] appears in the original patent but forms no part of this reissue specification; matter printed in italics indicates the additions made by reissue.

This invention relates to centrifugal separators of the liquid powered kind for separating particulate contaminants from a liquid that is pumped repeatedly around a closed circuit, such as hydraulic or transmission oil.

BACKGROUND

Liquid-powered centrifugal separators are well known for separating fluids of different densities or for separating particulate matter from liquids and have long been used in lubrication systems for engines and analogous items of vehicles. The common principle of operation is that a housing contains a rotor which is supported therein to spin at high speed about a substantially vertical axis. The rotor comprises a container to which liquid is supplied at elevated pressure along the axis of rotation and is ejected from tangentially directed reaction jet nozzles into the housing from which it drains to the engine sump. Contaminated liquid is also supplied to the rotor to pass therethrough, and in doing so, denser contaminant materials are separated therefrom centrifugally and retained in the rotor. The drive liquid may comprise the contaminated liquid in a so-called self-powered centrifugal separator of the type described, for example, GB-A-735658, GB-A-757538, GB-A-2160796, or GB-A-2383194, or it may be separate liquid as described in GB-A-2297499.

Notwithstanding the origin of the rotor drive liquid, the energy lost by the ejected liquid effects rotation of the rotor about the axis at a speed fast enough for the contaminated liquid circulating in, and passing through, the rotor to deposit solid contaminants on surfaces that are spaced radially outwardly of the axis and face radially inwardly towards the axis. For efficient separation, and to ensure that separated contaminants do not interfere with the reaction jet nozzles, the rotor container may be provided with a radially inwardly extending partition wall that effectively divides the rotor into a separation chamber, in which the solids collect, and an outflow chamber, to which the cleaned liquid passes by way of a transfer aperture cited near the rotation axis. It is common in modem designs, such as, EP 0193000 and GB 2283694, for this partition wall to extend both radially and axially as what is sometimes referred to as a separation cone, which better holds solids within the separation chamber if the rotation axis is tilted from the vertical.

The above identified centrifugal separators are employed principally within pumped lubrication systems of internal combustion engines wherein the contaminants comprise inter alia carbonaceous products of combustion, such as soot particles and the like which tend to bind with the liquid and other solid materials that are retained in the rotor into a dense, cohesive coke-like mass which adheres to upstanding walls of the rotor, even after rotation has ceased, permitting a simple internal structure for the rotor. Even if such material does fall from the rotor wall onto the partition wall, forming it with a slight inclination as a separation cone is sufficient to inhibit the material from being entrained in newly introduced liquid through the annular transfer aperture to the reaction jet nozzles before subsequent rotation applies sufficient centrifugal force to return it to the peripheral wall.

However, in the case of liquids which are not contaminated by combustion products the centrifugal separation tends to result in non-cohesive contaminant particles which settle out from the liquid as a wet slit that is relatively mobile and easily washed or entrained by liquid flow as a slurry. It is found that when such non-cohesive contaminants settle out onto the peripheral side wall of a rapidly spinning rotor as a result of centrifugal separation, the non-cohesive nature of the material spreads them out across the vertical wall as a slit of substantially uniform thickness, and that when the rotation speed falls or ceases altogether as a result of ceasing to supply liquid to the rotor the non-cohesive slit slumps downwards and collects on the partition wall. In such a situation, and, notwithstanding any inclination of the partition wall as a separation cone, the non-cohesive slit is readily entrained by subsequently supplied liquid into the transfer aperture before the rotor is caused to spin at such a rate as separate the contaminants from the liquid and hold them within the rotor container against the peripheral side wall thereof.

SUMMARY OF THE INVENTION

It is an object of the present invention to provide a centrifugal separator for separating non-cohesive particulate contaminants from a liquid passed therethrough that mitigates problems regarding entraining the contaminants back into the liquid.

According to the present invention a centrifugal separator for separating non-cohesive particulate contaminants from a liquid supplied thereto comprises a housing enclosure, an axis extending through the housing enclosure in an operationally substantially vertical orientation, a rotor arranged to receive a liquid at elevated pressure and, in reaction to ejection of the liquid therefrom substantially tangentially, spin about the axes at at least a predetermined minimum speed to effect separation of the non-cohesive contaminant particles from contaminated liquid therein, the rotor comprising a container having (i) an outer, peripheral wall including a peripheral side wall displaced from the axis, (ii) an internal partition wall extending radially inwardly from the peripheral wall dividing the container into a separation chamber and an outflow chamber and defining at its radially inner periphery a transfer aperture between the separation and outflow chambers, the separation chamber including an inlet aperture to admit contaminated liquid thereto from the rotation axis and the outflow chamber having at least one nozzle to eject liquid from the container, and (iii) barrier wall means within the separation chamber, comprising a barrier wall extending upwardly from the partition wall to terminate in a barrier wall edge and disposed radially inwardly of the peripheral side wall, to define with the peripheral side wall and partition wall a contaminant retention region, the barrier wall being inclined towards the peripheral side wall such that the barrier wall edge is spaced therefrom to form a radially restricted neck to the contaminant retention region at such inclination and spacing, when the rotor is spinning about the axis at at least the predetermined minimum speed, that non-cohesive contaminants deposited on the barrier wall by centrifugal separation force are caused by said force to flow from the barrier wall edge to the peripheral side wall, and, when the rotor is not spinning at at least the predetermined speed, to permit the separated non-cohesive contaminants deposited on the peripheral side wall to slump into the contaminant retention region and be inhibited from being entrained into liquid flowing between the inlet and transfer aperture.

Embodiments of the invention will now be described by way of example with reference to the accompanying drawings.

DETAILED DESCRIPTION OF THE DRAWINGS

Figure 1A:
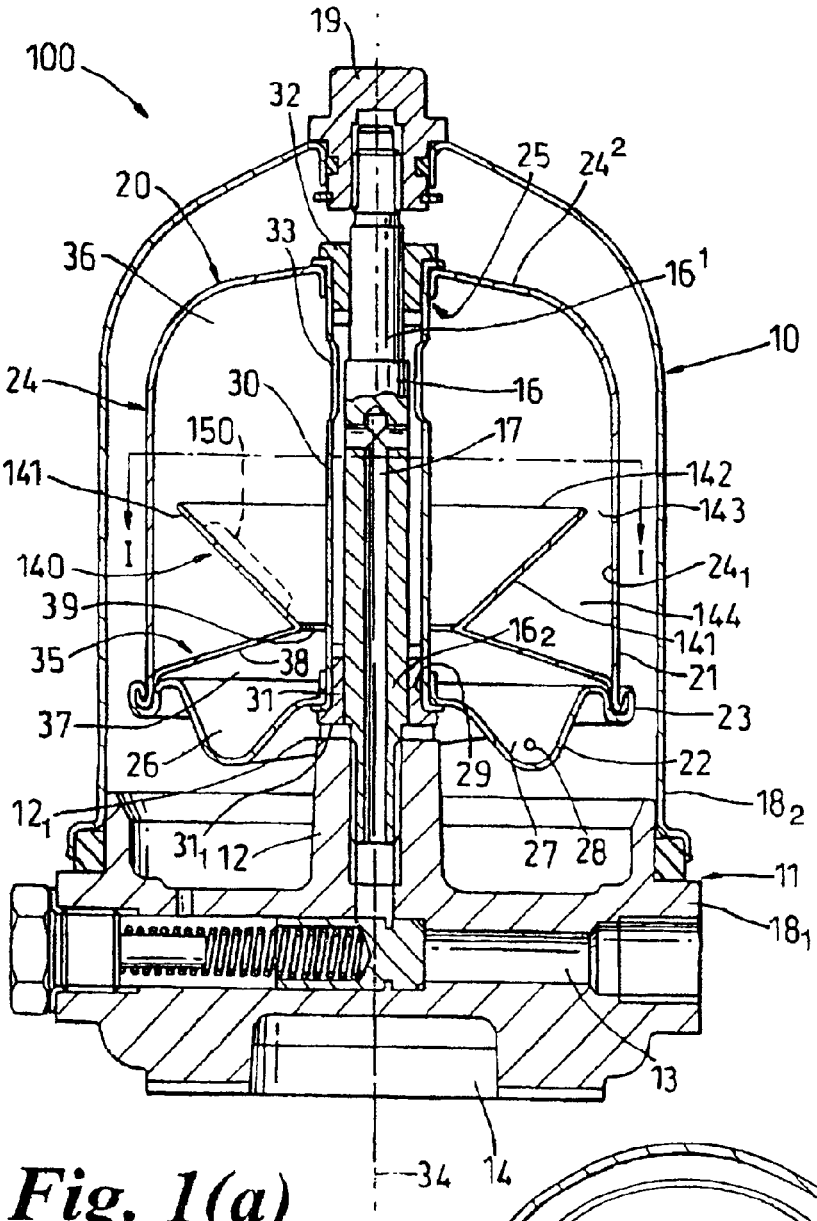
FIG. 1(a) is a sectional elevation through a first embodiment of liquid powered centrifugal separator in accordance with the present invention, illustrating a housing through which extends a stationary end-fed spindle on which is mounted a rotor having a peripheral wall endosing separation and outlet chambers separated by a radially inwardly extending partition wall and within the separation chamber barrier wall in the form of a conical barrier wall extending upwardly from the partition wall and diverging outwardly to a barrier wall edge separated from the peripheral wall by a narrow annular neck.
Figure 1B:
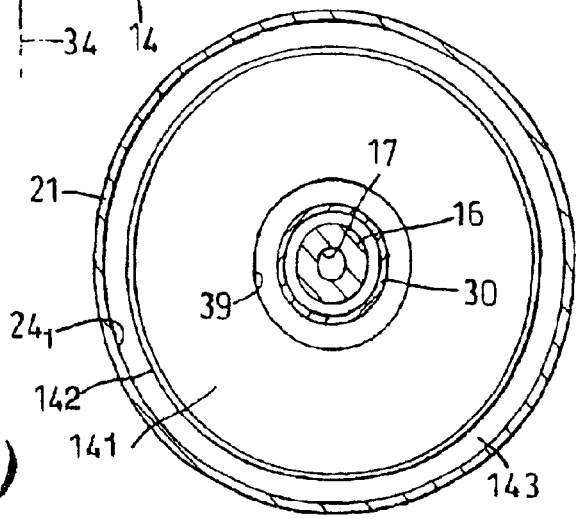
FIG. 1(b) is a cross-section along the line 1—1 of FIG. 1(a) illustrating the circular form of barrier wall.

Referring to FIGS. 1(a) and 1(b), liquid powered centrifugal separator of non-cohesive contaminants from a liquid is indicated generally at 100, being of a self-powered type in which the contaminated liquid itself is the source of motive power that provides rotation leading to centrifugal separation of the contaminants.

The separator arrangement 100 comprises a housing 11 in the form of a support structure 12 coupled to receive pumped liquid by way of supply duct 13 and return it to a sump by way of drain duct 14, thereby by-passing components which use the pumped liquid. The support structure 12 has fixed thereto a substantially vertically extending axle means 16 in the form of a spindle which has a passage 17 extending at least part way along and coupled to the supply duct 13 at its lower end. The housing is in vertically separable parts $\mathbf{18}_1$ and $\mathbf{18}_2$ and the upper end of the spindle $\mathbf{16}_1$ is secured to, and secures, a housing part $\mathbf{18}_2$ releasably sealed to the part $\mathbf{18}_1$ by means of nut 19.

A rotor 20 is mounted within the housing for rotation about the spindle 16. The rotor is substantially conventional in comprising a container formed from pressed steel sheet components 21 and 22 jointed at a folded seam 23. The component 21 defines a peripheral, or outer, wall 24 which extends as an axial side wall $\mathbf{24}_1$ and integral radially inward end wall $\mathbf{24}_2$ with central aperture 25. The component 22 forms a substantially radially extending base of the peripheral wall in which are formed recesses 26, 27 containing a pair of tangentially directed jet reaction nozzles, one only of which is visible at 28, the base being apertured at 29 in line with aperture 25 on the longitudinal axis of the rotor.

A hollow member 30 extends between and through the axially spaced apertures 25 and 29, being swaged to the container components to act as a spacer for the ends of the peripheral wall and a receptacle for hearing bushes 31 and 32 which support the rotor for rotation about spindle 16, the longitudinal axis of the rotor therefore being synonymous with the rotation axis of the rotor, indicated 34.

The spindle passage 17 opens into the tubular member, which forms an inlet aperture at 33 to admit liquid at supply pressure to the container from the rotation axis. The spacer member 30 thus forms a radially inner wall for the container.

Within the container, internal partition wall 35 extends radially inwardly from the peripheral wall at the seam 23 and divides the container into a separation chamber 36 (in which contaminants are separated from the liquid) and an outflow chamber 37 in communication with the reaction nozzles, 28 etc. The radially inner periphery 38 of the partition wall defines a transfer aperture 39 between the separation and outflow chambers 36 and 37.

The upper part of the spindle $\mathbf{16}_1$ is of lesser diameter than the lower part, $\mathbf{16}_2$, such that the ends of the bushes 31 and 32 exposed to the liquid pressure in tubular member 30 have forces acting thereon related to such diameter. Thus in operation a greater force acts on the upper bush 32 in an upward direction which tends to lift the rotor to counter its weight, the degree of lift being dependant on instantaneous supply pressure. Clearly if the pressure is such that the pressure-induced lift exceeds the weight of the rotor the rotor will move to contact the housing part $\mathbf{18}_2$ and to accommodate this a pressure lift thrust bearing is formed by substantially radially extending flanges $\mathbf{32}_1$ of bush 32 and static bush 38 secured to the housing part.

The weight of the rotor is taken, except when overcome by said pressure-induced lift, by weight thrust bearing means. Conventionally such weight thrust bearing means comprises an image of the pressure lift thrust bearing, that is, radially extending flange surface $\mathbf{31}_1$ to the lower end of bush 31 and upper end $\mathbf{12}_1$ of support structure 12.

The rotor thus far described is essentially conventional, of a type known in lubrication systems of internal combustion engines and in which, subject to the ejected liquid causing the rotor to spin at at least a minimum speed that generates a particular level of centrifugal force, particulate contaminants are separated from the liquid and driven radially outwardly towards the inwardly facing peripheral side wall $\mathbf{24}_1$. Furthermore, as discussed above, in such known usage the separated contaminants are of a form which tend to adhere to the peripheral wall and/or each other and the partition wall 35 is able, by being inclined with respect to the rotation axis at an acute angle, to inhibit solid contaminants which tend to collect adjacent the peripheral side wall from falling into the outflow chamber with attendant risk of reaction jet nozzle blockage or return to the lubricant sump.

However, to deal with contaminants which remain as separate particles within the liquid as a non-cohesive slurry or sludge (depending on the liquid concentration) such simple slight inclination of the partition wall is insufficient to prevent such contaminants as collect thereon from being washed by the liquid into the transfer aperture in the absence of such centrifugal force as keeps the particles against the peripheral side wall, that is, when the rotor is rotating at less than a predetermined minimum rotation speed that generates such centrifugal force. Not only are such deposited particles on the partition wall readily turned into a slurry and entrained into the liquid flow through the container but also the non-cohesive nature of the deposits formed on the vertical peripheral side wall during rotation means that such deposits slump from the side wall onto the partition wall in the absence of such rotation, increasing the likelihood of such entrainment into the transfer aperture.

In accordance with the present invention there is provided within the rotor container separation chamber 36 barrier wall means, indicated generally at 140, disposed radially inwardly of the peripheral side wall $\mathbf{24}_1$.

The barrier wall means comprises a barrier wall 141 extending upwardly from the partition wall 35 and terminating in a barrier wall edge 142. The barrier wall is rigid and extends circumferentially completely around the axis 34 into a frusto-conical form that is circular in plan view, as illustrated by FIG. 1(b). The barrier wall, peripheral side wall and partition wall define therebetween a contaminant retention region 144 and the barrier wall is inclined towards the peripheral side wall 24, with the barrier wall edge 142 separated therefrom by a radially restricted neck 143 which is the sole passage of communication between contaminant retention region and separation region of the separation chamber.

The inclination of the barrier wall with respect to the vertical axis is chosen having regard to the speed of rotation obtainable from the liquid supply and the nature of the non-cohesive contaminants it contains such that at a predetermined minimum rotation speed the barrier wall inclination permits non-cohesive contaminants deposited thereon, by centrifugal separation from the liquid passing therebetween the inlet and transfer aperture, are caused by the component of centrifugal force acting along the wall to flow towards the barrier wall edge 142 and then from It to the peripheral side wall 143. The non-cohesive nature of contaminant deposit is such that it spreads axially into a layer of substantially uniform thickness whilst the centrifugal force predetermined spin speed remains.

When the rotor slows significantly, or is stationary, such non-cohesive deposit slumps downwardly and collects in the contaminant retention region 144. When liquid is next supplied to the rotor under pressure and proceeds to pass through the transfer aperture 39 to the outflow chamber 37 and, if necessary, begins to fill the separation chamber, it does so without disturbing the silt of non-cohesive contaminants sufficiently for significant quantity thereof to flow through the neck 143 and be entrained in the liquid passing to the transfer aperture. It will be appreciated that as soon as the separation chamber is filled with the liquid the rotor can commence rotation and accelerate quickly to a speed at which any of the contaminant silt washed from the retention region is driven by centrifugal force back towards the peripheral side wall whereupon it reforms as a layer that spreads over the peripheral side wall, essentially climbing out of the retention region but into which it again slumps as the rotor speed next falls. Therefore, in successive cycles of operation of the centrifugal separator the non-cohesive contaminants form a gradually accumulating silt which is alternately collected on uniformly across the peripheral side wall of the rotor when in operation and slumps into the retention region in the absence of such centrifugal force but which is, in both situations, inhibited from being entrained to liquid flow to the jet reaction nozzles.

It will be appreciated that the efficiency of separation of contaminant particles from the liquid in the separation chamber is a function of the rotational speed of the liquid rather than the rotor container per se, that is, the liquid should not rotate more slowly than the rotor, and to this end the barrier wall may be provided at its radially inwardly facing surfaces with radially extending baffle means arranged to encourage rotation of the liquid with the barrier wall, such as by way of one or more radially elongate embossments of the barrier wall itself 150 or (not shown) a separately formed flange secured to the surface of the wall. Such baffle means associated with the barrier wall may be additional to similar baffle means for the same purpose defined at the peripheral wall of the rotor container.

Figure 2:
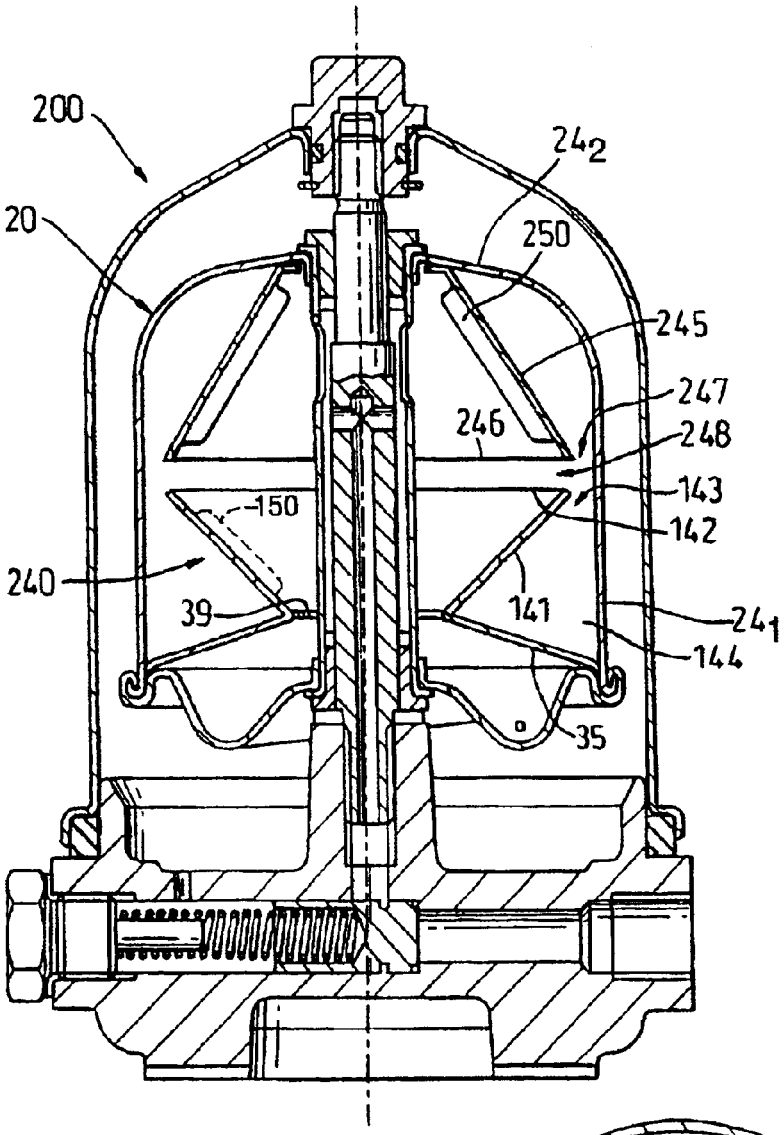
FIG. 2 is a sectional elevation through a second embodiment of centrifugal separator, generally similar to that of FIG. 1 but including complementary barrier wall means comprising a downwardly extending complementary barrier wall within the separation chamber axially facing the upwardly extending barrier wall and diverging outwardly to a complementary barrier wall edge that is separated radially from the peripheral wall of the rotor and separated axially from the barrier wall edge.

Referring to FIG. 2, this a sectional elevation through a second embodiment of centrifugal separator 200 which differs from the separator 100 in respect of the barrier wall means indicated generally at 240. The components of the separator that are identical are given the same reference numbers.

The barrier wall means 240 comprises the conical upstanding barrier wall 140 described above which terminates in barrier wall edge 142 and defines contaminant retention region 144 accessed by way of restricted neck 143 adjacent the peripheral side wall $\mathbf{24}_1$. In addition thereto the barrier wall means 240 comprises associated with the barrier wall an axially facing, downwardly extending complementary barrier wall 245 that extends from the upper end portion $\mathbf{24}_2$ of the peripheral wall of the rotor and is likewise inclined towards the peripheral side wall $\mathbf{24}_1$, terminating in a complementary barrier wall edge 246 that is spaced radially from the side wall to define a restricted neck 247 and axially from the barrier wall edge 142 to define therebetween circumferential, radially facing, gap 248. The radially inner surface of the complementary barrier wall may be provided with upstanding baffle means 250. It will be appreciated that in operation, when the rotor is spinning at at least said predetermined minimum speed, the barrier and complementary barrier walls effectively define a separation region surrounding the inlet and transfer apertures on the radially inwardly facing surfaces of which contaminants separated form the liquid are deposited. The non-cohesive contaminants are, as described above, displaced by the centrifugal force towards the gap 248 through which they pass to be deposited on peripheral side wall $\mathbf{24}_1$. As also discussed above, the non-cohesive nature of the deposited contaminants results in them spreading across the peripheral side wall to a layer of substantially uniform thickness rather than accumulating in the vicinity of the gap.

When the rotor ceases to rotate the deposit layer on the peripheral side wall slumps into the contaminant retention region 144 as discussed above. When the liquid is next applied to the stationary or slowly rotating rotor any silt that is washed into a slurry by the liquid not only has to pass through the restricted neck 143 but also the gap 248 before it can be entrained to flow through the transfer aperture 39.

Figure 3:
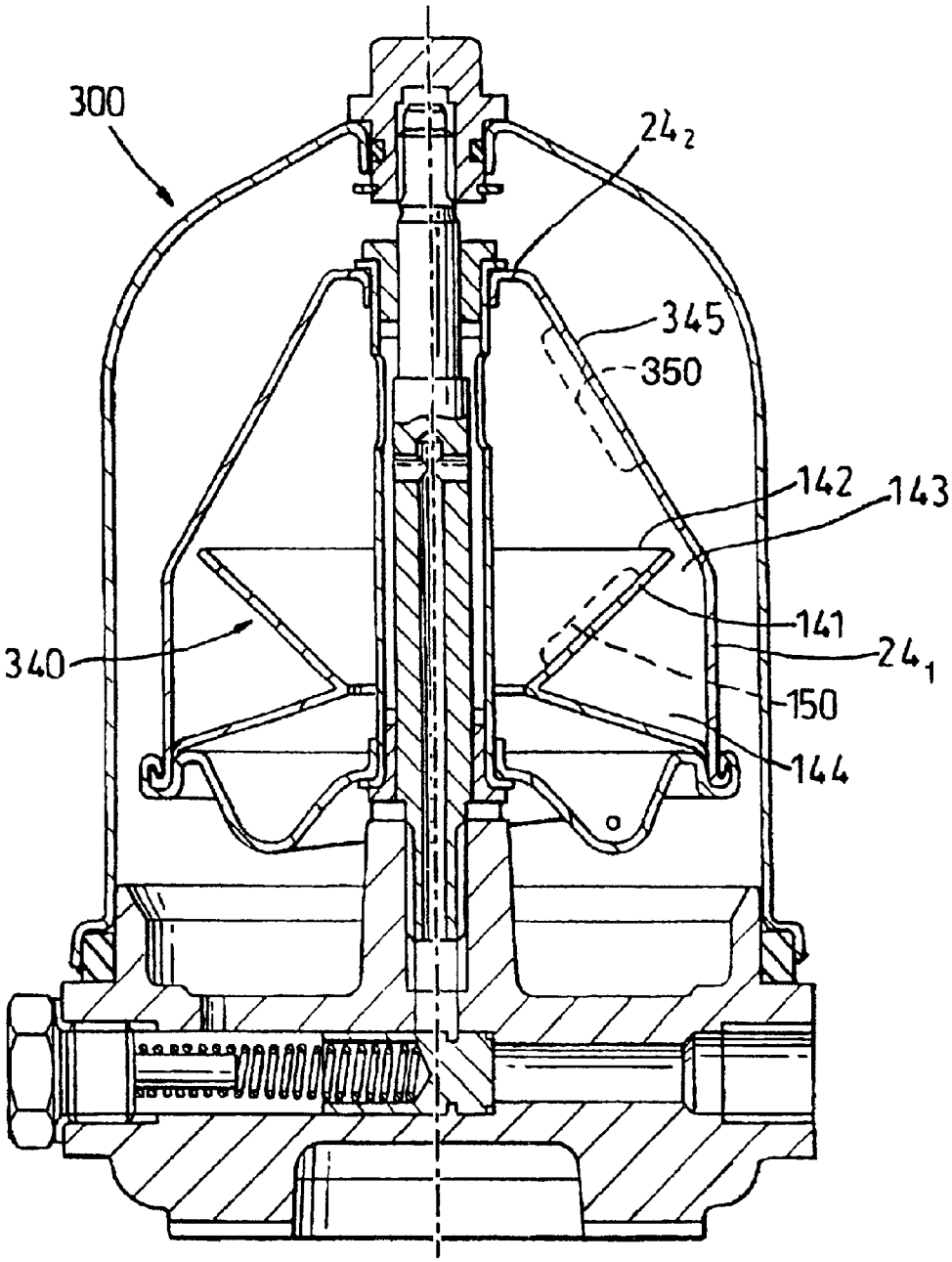
FIG. 3 is a sectional elevation through a third embodiment of centrifugal separator in accordance with the present invention which differs from that of FIG. 2 in that the complementary barrier wall is formed by a conically tapering portion of the rotor peripheral wall.

Referring to FIG. 3, this shows a third embodiment of centrifugal separator 300 that is functionally similar to that of FIG. 2. Centrifugal separator 300 has, indicated generally at 340, barrier wall means comprising the above described barrier wall 141 terminating in barrier wall edge 142 and defining contaminant retention region 144 accessed by way of neck 143. Complementary barrier means is provided by a downwardly extending, outwardly inclined complementary barrier wall 345 that is formed by a portion of the peripheral wall of the rotor intermediate the end wall $\mathbf{24}_2$ and side wall $\mathbf{24}_1$. The complementary barrierwall merges with the side wall portion slightly below the level of the neck 143 such that in operation of at least the predetermined minimum rotor speed any non-cohesive contaminants that are deposited on the peripheral wall section 345 directly or deposited thereon from the edge 142 of the barrier wall are displaced downwardly to the vertically extending side wall 24, across which they spread and from which they slump in the absence of adequate rotation. The radially inwardly facing surface of the complementary barrier wall/rotor peripheral wall 345 may be provided with one or more elongate baffles 350 to encourage rotation of the liquid at the same speed as the rotor.

Figures 4, 5, 6:
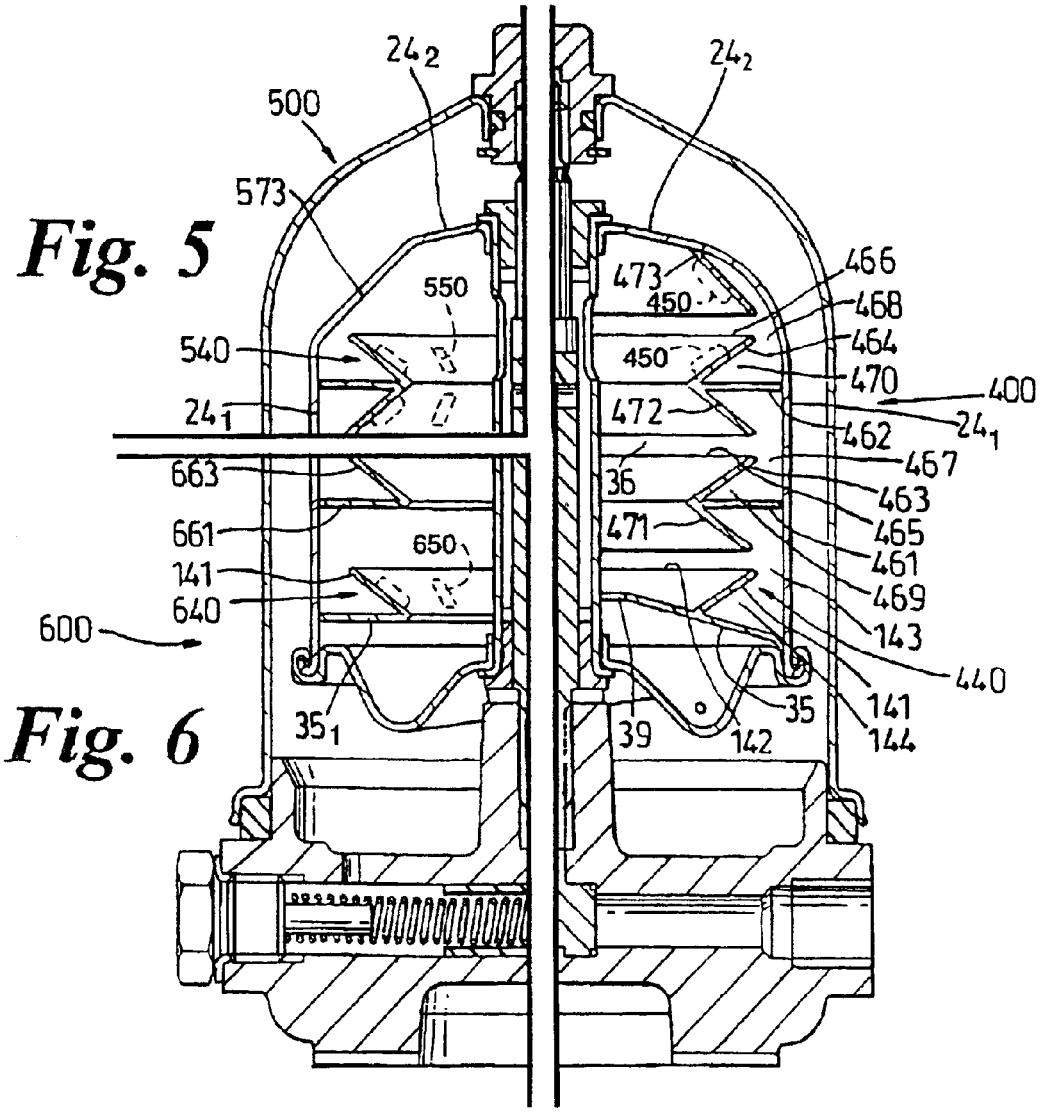
FIG. 4 is a sectional elevation of a fourth embodiment wherein the separation chamber includes a plurality of axially spaced internal partition walls, the barrier means comprises additional barrier walls extending from the internal partition walls and the complementary barrier means comprises a corresponding number of complementary barrier walls facing them.
FIG. 5 is a sectional elevation of a fifth embodiment differing from that of FIG. 4 in that the uppermost complementary barrier wall is formed by a conically tapering portion of the rotor peripheral wall.
FIG. 6 is a sectional elevation of a sixth embodiment differing from that of FIG. 4 in that there is no complementary barrier means and the partition wall extends horizontal rather than as enclosed in the manner of a separation cone.

FIGS. 4, 5, and 6 represent in sectional elevation a composite of fourth, fifth and sixth embodiments of centrifugal separator. Returning to FIG. 4, centrifugal separator 400 has a further variant of barrier wall means indicated generally at 440. The barrier wall means comprises, as before, the barrier wall 141 extending upwardly from the partition wall 35 and inclined radially outwardly towards peripheral side wall $\mathbf{24}_1$, terminating in barrier wall edge 142 that defines neck 143 and contaminant retention region 144. Within the separation chamber 36 are two additional partition walls 461, 462 extending radially inwardly from the peripheral side wall $\mathbf{24}_1$. Extending upwardly from the respective additional partition walls are additional barrier walls 463, 464 inclined towards the peripheral side wall $\mathbf{24}_1$ and terminating in additional barrier wall edges 465, 466 that define, with the peripheral side wall, necks 467, 468 and, between the additional barrier walls and additional partition walls, additional contaminant retention regions 469 and 470.

Associated with each barrier wall 141 and additional barrier wall 463 and 464 is a complementary barrier wall 471, 472 and 473 respectively. Each complementary barrier wall is substantially the same as the complementary barrier wall 245 described above, extending downwardly and inclined radially outwardly towards the peripheral side wall, terminating in a complementary barrier wall edge 474, 475, 476 respectively that is spaced from the peripheral side wall $\mathbf{24}_1$ by a restricted neck and substantially overlies the edge of the associated barrier wall or additional barrier wall to define a circumferential gap. The uppermost complementary barrier wall 473 is secured to the end wall $\mathbf{24}_2$ of the rotor whereas the complementary barrier walls 472 and 471 are carried by the additional partition walls 462 and 461 along with the additional barrier walls 464 and 463 respectively. Additional and complementary barrier walls carried by each additional partition wall may be formed integrally with each other.

Function is substantially as described above for separator 200 except that there are provided three contaminant retention regions at different axial height and the contaminants deposited on the peripheral side wall have less distance to slump and risk turning to slit that finds its way into the liquid flow to the transfer aperture 39.

It will be appreciated that there may be more or fewer than two additional partition walls and additional barrier walls.

Referring to FIG. 5, the centrifugal separator 500 is essentially similar to separator 400 in respect of the barrier wall means, indicated generally at 540, having additional barrier walls and a corresponding number of overlying complementary barrier walls, differing only in that the complementary barrier wall 573 that is uppermost in the separation chamber is defined by an inclined peripheral wall section between the side wall $\mathbf{24}_1$ and end wall $\mathbf{24}_2$.

Referring to FIG. 6, the centrifugal separator 600 has barrier wall means indicated generally at 640, comprising the upstanding barrier wall 141 and at least one additional partition wall 661 on which is carried upstanding additional barrier wall 663, there is however no complementary barrier means having downwardly extending complementary barrier walls. The separator 600 also distinguishes from those described above in that the partition wall $\mathbf{35}_1$ between separation and outflow chambers is not upwardly inclined, in the manner of a separation cone that is per se sufficient to effect a retention region for cohesive contaminants in different applications, but extends substantially horizontally in the manner of the additional partition wall(s). Such attitude of partition wall may, of course, be employed with any of the embodiments described herein as the upstanding barrier wall is the principal means of defining the ability to retain deposits.

It will be appreciated that any or all of the barrier, additional barrier and complementary barrier walls may be provided with outstanding baffles to encourage liquid rotation. For example, see baffles 450, 550 and 640 in FIGS. 4, 5 and 6, respectively.

Figures 7, 8:
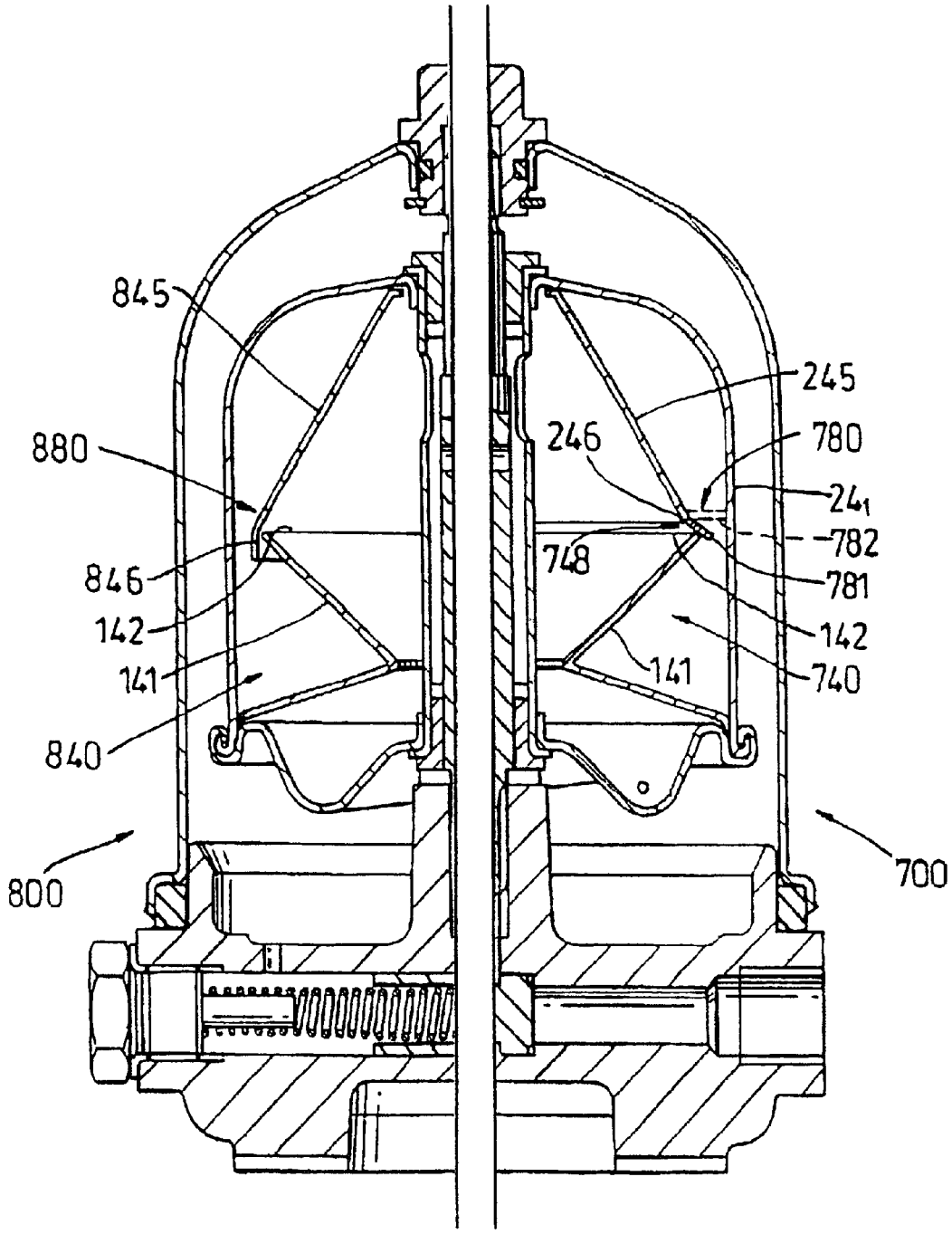
FIG. 7 is a sectional elevation through a seventh embodiment of centrifugal separator in accordance with the invention, being generally similar to FIG. 2 but wherein the gap between the barrier edges of the barrier wall and complementary barrier wall is closed by valve means openable in response to radially outwardly directed force.
FIG. 8 is a sectional elevation through an eighth embodiment of centrifugal separator, similar to that of FIG. 7 but wherein the valve means is defined by a stretchable complementary barrier wall.

Referring now to FIGS. 7 and 8 these show a composite sectional elevation of a seventh and eighth embodiments of centrifugal separator 700 and 800 respectively.

In FIG. 7 the barrier wall means, indicated generally at 740, is similar to the barrier wall means 240 described above with reference to FIG. 2 in having upwardly extending barrier wall 141 that terminates in barrier wall edge 142 and downwardly extending complementary barrier wall 245 that terminates in complementary barrier wall edge 246, both of which edges are disposed close to, but separated from the rotor peripheral side wall $\mathbf{24}_1$. Preferably the edge 246 of the complementary wall is separated further from the peripheral side wall 24, than barrier wall edge 142 such that the circumferential gap 748 defined between these radially offset edges is inclined upwardly.

The barrier wall means 740 further includes valve means, indicated generally at 780. The valve means comprises a flap 781 of flexible and impermeable material that is carried by the edge 246 of the complementary barrier wall such that gravity drapes it to abut the edge 142 of the barrier wall when the rotor is stationary or spinning only slowly. At the predetermined minimum operational speed, the action of centrifugal force on the flap (possibly aided by the outward force of the contaminants and liquid) raises the flap from the edge of the barrier wall and permits passage of the non cohesive contaminants to the peripheral side wall $24_1$ of the rotor, as illustrated in by broken line 782.

Absent adequate rotation speed, noncohesive contaminants washed by liquid in the contaminant retention region find difficulty in returning to the main part of the separation chamber and entrainment into the transfer aperture 39.

It will be appreciated that such a simple form of valve means may be employed between additional barrier walls and complementary barrier walls of the type shown in FIG. 4 and also that the valve means may take any other form that effects opening of a passage to the, or each, retention region when subjected to the centrifugal forces that obtain above the predetermined minimum operational rotation speed.

For example, the valve means may, instead of comprising a circumferentially continuous flap of flexible material may comprise a plurality of discrete, and possible rigid flaps.

Figure 1C:
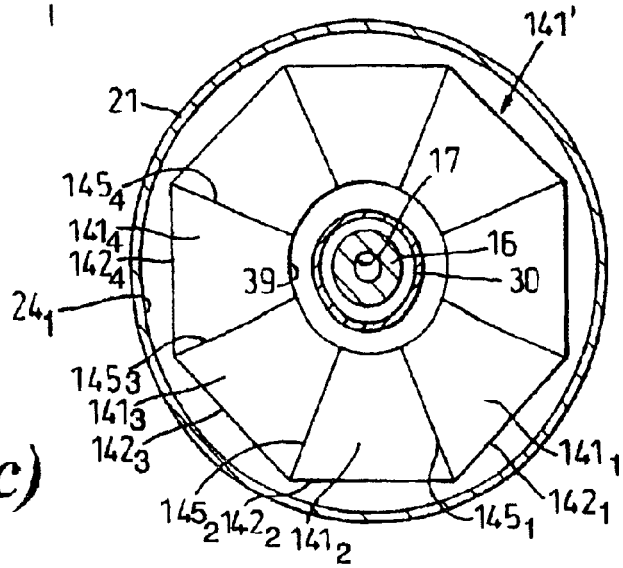
FIG. 1(c) is a cross-section view, similar to that of FIG. 1(b) but showing an alternative polygonal form of barrier wall.

Also, the barrier wall 141 and any additional or complementary barrier wall may be other than part of a cone that is circular in cross section. Referring to FIG. 1(c), the barrier wall 141' may, for example, be polygonal in cross-section being formed by abutment of an array of wall members $141_1$, $141_2$, $141_3$, . . . which may be flat or curved in profile. Notwithstanding the use of valve means the corners $145_1$, $145_2$, $145_3$ , . . . formed by the junctions between members may serve as the above described baffle means in encouraging the liquid to rotate with the wall. If valve means is employed, such wall members may serve to provide wall edges $142_1$, $142_2$, $142_3$, . . . for flaps of the valve means or effect valve means themselves by virtue of the edges of some or all wall members being radially deflectable in response to the centrifugal force obtaining at said minimum operational rotation speed but otherwise undeflected to close off against a co-operating wall edge. Although a barrier wall 141' is illustrated, the above applies equally to an additional barrier wall or complementary barrier wall.

If the material of any barrier wall, additional barrier wall or complementary barrier wall is stretchable as well as deflectable, a wall of such material may comprise integral valve means. Referring to FIG. 8, centrifugal separator 800 has barrier wall means 840 comprising barrier wall 141, terminating at barrier wall edge 142, and facing it a complementary barrier wall 845 formed of a flexible material and having an edge region 846 which overlies the barrier wall edge 142 and substantially in abutment therewith circumferentially about the axis. The material of the wall 845 is resiliently deformable, possibly stretchable, such that the edge region 846 is responsive to the radially outward centrifugal force per se, and/or the force applied thereto by the contents of the separation region, to move away from the edge 142 of the barrier wall and permit passage of separated contaminants, returning to the abutment position in the absence of adequate centrifugal force. The edge region of the complementary barrier wall, and possibly the whole wall itself, therefore comprises valve means 880.

If desired any or all of the barrier or additional barrier walls may be made of a flexible, and possibly resiliently stretchable material. It will be appreciated that valve means operated by centrifugal force is well known per se and any suitable valve means may be employed with such barrier wall, additional barrier wall and complementary barrier wall.

In all of the above described embodiments the rotor container is of the so-called disposable type in which the components are permanently secured to each other, for example, folded seam 23 and swaged tubular member 30. The additional structures of the barrier wall means may, of course be used within a rotor container that may be opened for cleaning.

Notwithstanding the rotor container construction, the additional components that comprise the barrier means may be mounted as a sub-assembly that can be inserted into a rotor container during manufacture and possibly removable during cleaning, if appropriate. Such a sub-assembly also permits ready and optional incorporation of the barrier means in existing designs of rotor container.

Figure 9:
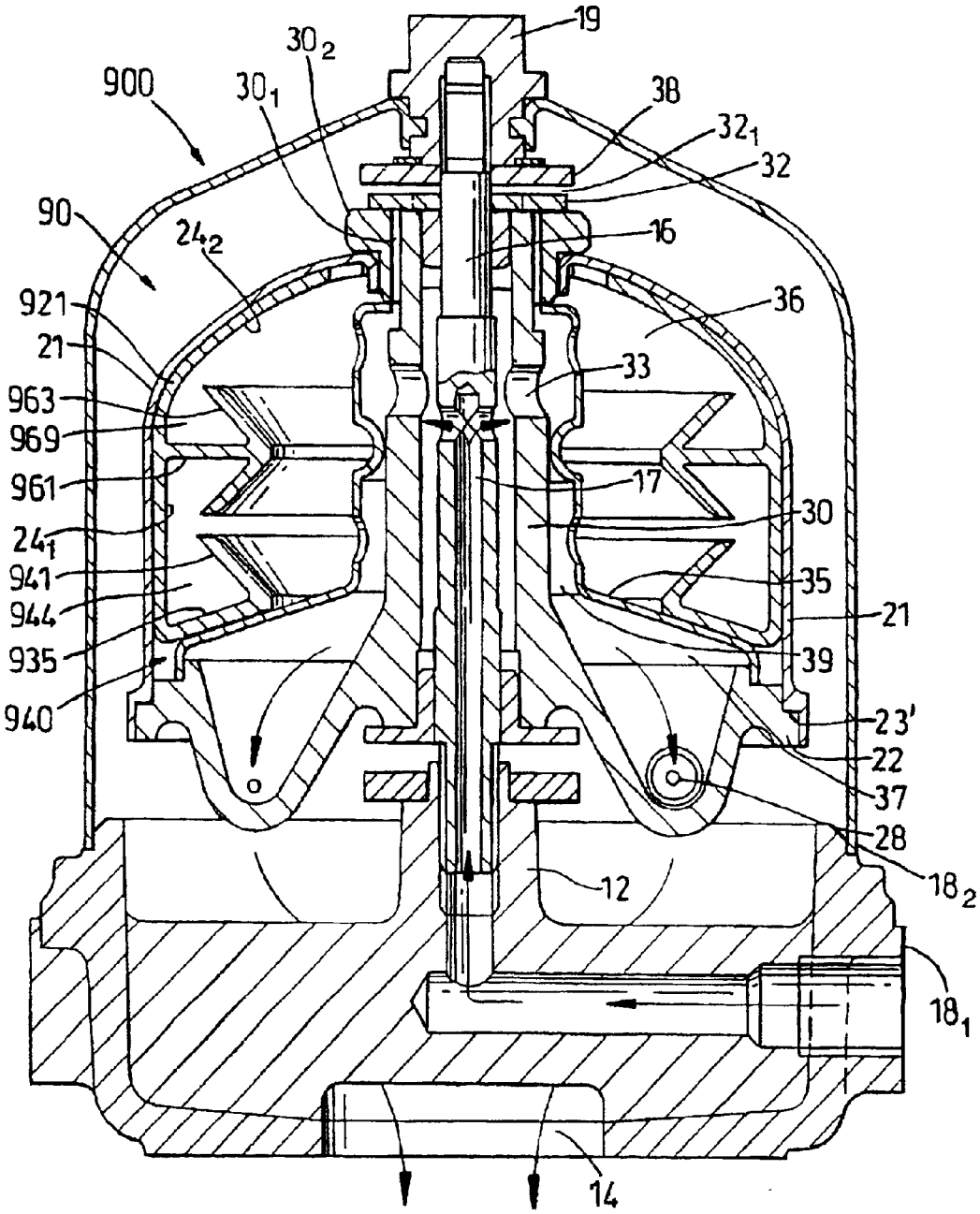
FIG. 9 is a sectional elevation through a ninth embodiment of centrifugal separator in which the rotor container can be disassembled and the barrier means is formed as a unitary body for insertion into, and removal from, the rotor container.

Referring to FIG. 9, this shows in sectional elevation a centrifugal separator 900 in which the rotor container 90 can be disassembled for cleaning, the tubular member 30 being integral with base member 22 and extending at its upper end $30_1$ through aperture 25 in the peripheral end wall $24_2$ of confined 21, the upper end $30_1$ being externally threaded to receive a damping nut $30_2$ which retains the rotor wall component 21 by means of the end wall and applies sealing pressure to partable seam 23'. Within the rotor chamber 90 partition wall 35 divides it into separation chamber 36 and outflow chamber 37. Barrier wall means 940 in accordance with the invention is disposed within the separation chamber as a unitary sub-assembly having barrier wall 941, additional barrier wall 963 and complementary barrier wall 971. The additional and complementary barrier walls are carried by an additional partition wall 961 and the barrier wall 941 is carried by a supplementary partition wall 935 which is supported on the true partition wall 35 and comprises a second layer of partition wall. Similarly, the peripheral wall of the component 21 of the rotor container is lined with a second, inner, layer 921 which provides, functionally, the peripheral side wall $24_1$ and peripheral end wall $24_2$, the additional partition wall 961 and supplementary partition wall are connected to, or formed integrally with, the layer 921 and thus define a unitary sub-assembly structure within which the non-cohesive deposits are contained, whether on the peripheral side wall or retention regions 944 and 969. The unitary subassembly structure with such contained contaminant deposits may be removed from the rotor container and, in view of the non-cohesive nature of the deposits, cleaned and re-used. The unitary barrier means subassembly may conveniently be a single-piece moulding of plastics material, which material may have sufficient flexibility at the edges of the walls to provide the above described valve means.

In all of the above described embodiments the barrier wall, additional barrier wall(s) and complementary barrier wall(s) have been described and shown as being inclined at a constant angle and terminating in a simple edge. It will be appreciated that any wall may have a varying inclination and/or terminate in a lip structure that facilitates the passage of contaminants to the peripheral side wall and/or inhibits return of such contaminates into the separator region.

It will be appreciated that although the invention has been described herein in embodiments in which the axle means is in the form of a static spindle, the barrier means may be provided within a rotor container that is mounted on a shaft or having shaped ends fixed with respect to the rotor and rotatable with respect to the housing.

Also, in all of the above described embodiments, the rotor container is of the self powered type in which the contaminated liquid is supplied at such pressure as to spin the rotor by virtue of its ejection form nozzles 48. It is reiterated that it may be driven by liquid supplied for this purpose separate from the contaminated liquid, as described in the aforementioned specification GB-A-2297499.

What is claimed is:

1. A centrifugal separator for separating non-cohesive particulate contaminants from a liquid supplied thereto comprising a housing enclosure, an axis extending through the housing enclosure in an operationally substantially vertical orientation, a rotor arranged to receive a liquid at elevated pressure and, in reaction to ejection of the liquid therefrom substantially tangentially, spin about the axis at least a predetermined minimum speed to effect separation of said non-cohesive contaminant particles from contaminated liquid therein, the rotor comprising a container having (i) an outer, peripheral wall including a peripheral side wall displaced from the axis, (ii) an internal partition wall extending radially inwardly from the peripheral wall dividing the container into a separation chamber and an outflow chamber and defining at its radially inner periphery a transfer aperture between the separation and outflow chambers, said separation chamber including an inlet aperture to admit contaminated liquid thereto from the rotation axis and the outflow chamber having at least one nozzle to eject liquid from the container, and (iii) barrier wall means, within the separation chamber, comprising a barrier wall extending upwardly from the partition wall to terminate in a barrier wall edge and disposed radially inwardly of the peripheral side wall, to define with said peripheral side wall and partition wall a contaminant retention region, said barrier wall being inclined towards the peripheral side wall such that said barrier wall edge is spaced therefrom to form a radially restricted neck to the contaminant retention region at such inclination and spacing, when the rotor is spinning about the axis at least said predetermined minimum speed, that non-cohesive contaminants deposited on the barrier wall by centrifugal separation force are caused by said force to flow from the barrier wall edge to the peripheral side wall and, when the rotor is not spinning at least said predetermined speed, to permit the separated non-cohesive contaminants deposited on the peripheral side wall to slump into said contaminant retention region and be inhibited from being entrained into liquid flowing between the inlet aperture and the transfer aperture.

2. A centrifugal separator as claimed in claim 1 in which the barrier wall means comprises at least one additional partition wall extending radially inwardly from the peripheral side wall and an additional barrier wall extending upwardly from said at least one additional partition wall and terminating in an additional barrier wall edge and disposed radially inwardly of the peripheral side wall, to define with said peripheral side wall and additional partition wall additional contaminant retention region, said additional barrier wall being inclined towards the peripheral side wall such that said additional barrier wall edge is spaced therefrom to form a radially restricted neck to the additional contaminant retention region at such inclination and spacing, when the rotor is spinning about the axis at at least said predetermined minimum speed, that non-cohesive contaminants deposited on the additional barrier wall by centrifugal separation force are caused by said force to flow from the additional barrier wall edge to the peripheral side wall, and, when the rotor is not spinning at at least said predetermined speed, to permit the separated non-cohesive contaminants deposited on the peripheral side wall to slump into said additional contaminant retention region and be inhibited from being entrained into liquid flowing between the inlet aperture and the transfer aperture.

3. A centrifugal separator as claimed in claim 2 in which the barrier wall means further comprises a complementary barrier wall associated with said barrier wall or said additional barrier wall, and comprising a downwardly extending wall that, when the rotor is spinning about the axis at at least said predetermined minimum speed, is inclined towards the peripheral side wall and axially facing said barrier wall or said additional barrier wall whereby non-cohesive contaminants deposited on the complementary barrier wall by centrifugal force are caused by said force to flow to the peripheral side wall adjacent the neck of the contaminant retention region or additional contaminant retention region and, when the rotor is not spinning at at least said predetermined speed the non-cohesive contaminants are permitted to slump into said contaminant retention region or said additional contaminant retention region and inhibited by the neck from being entrained into liquid flowing between the inlet aperture and the transfer aperture.

4. A centrifugal separator as claimed in claim 3 in which the complementary barrier wall uppermost in the separation chamber is defined by peripheral wall of the rotor container.

5. A centrifugal separator as claimed in claim 3 in which said complementary barrier wall has, when the rotor is not spinning at at least said predetermined minimum speed, a complementary barrier wall edge spaced axially from said barrier wall or said additional barrier wall edge by a gap.

6. A centrifugal separator as claimed in claim 5 in which the barrier wall means includes valve means arranged to be biased to substantially close the gap and responsive to radially outwardly directed centrifugal separation force to overcome said bias and open the gap.

7. A centrifugal separator as claimed in claim 6 in which said complementary barrier wall and said barrier wall or said additional barrier wall extends completely circumferentially of the axis and the valve means comprises a flap of flexible and impermeable material carried by the complementary barrier wall edge and arranged to abut the barrier wall edge or additional barrier wall edge absent said outwardly directed centrifugal separation force.

8. A centrifugal separator as claimed in claim 6, in which at least one of said barrier wall, said additional barrier wall or said complementary barrier wall comprises, in a circumferential direction about said axis, a plurality of discrete wall members, at least one of said discrete wall members having a wall edge normally biased into abutment with a cooperating facing wall member and radially deflectable by spinning of the rotor substantially at said predetermined speed.

9. A centrifugal separator as claimed in claim 2 in which the barrier wall means further comprises a complementary barrier wall associated with said barrier wall or said additional barrier wall, and comprising a downwardly extending wall that, when the rotor is spinning about the axis at at least said predetermined minimum speed, is inclined towards the peripheral side wall and axially facing said barrier wall or said additional barrier wall whereby non-cohesive contaminants deposited on the complementary barrier wall by centrifugal force are caused by said force to flow to the peripheral side wall adjacent the neck of the contaminant retention region or additional contaminant retention region and, when the rotor is not spinning at at least said predetermined speed the non-cohesive contaminants are permitted to slump into said said contaminant retention region or said additional contaminant retention region and inhibited by the neck from being entrained into liquid flowing between the inlet aperture and the transfer aperture and at least one said complementary barrier wall extends from an additional partition wall.

10. A centrifugal separator as claimed in claim 1 in which the radially inwardly facing surface of at least one wall of the barrier wall means has baffle means arranged to encourage rotation of the liquid with the wall.

11. A centrifugal separator as claimed in claim 10 in which the baffle means comprises at least one radially extending embossement of the wall.

12. A centrifugal separator as claimed in claim 10 in which the baffle means comprises a flange secured to the surface of the wall.

13. A centrifugal separator as claimed in claim 11 in which said barrier wall means includes a plurality of discrete wall members arranged about the axis, said wall members being inclined with respect to each other in a circumferential direction to define at their junctions radially extending baffle means.

14. A centrifugal separator as claimed in claim 1 in which the barrier wall means is formed as a unitary sub-assembly, having at least a side wall, partition wall, supplementary partition wall and barrier wall extending therefrom to define integrally therewith the contaminant retention region.

*15. A rotor for a centrifugal separator, comprising:*

*a container having:*

(*i*) *an outer, peripheral wall including a peripheral side wall displaced from a longitudinal rotation axis of the rotor,*

(*ii*) *an internal partition wall extending radially inwardly from the peripheral wall dividing the container into a separation chamber and an outflow chamber and defining at a radial inner periphery a transfer aperture between the separation and outflow chambers, the separation chamber including an inlet aperture to admit contaminated liquid thereto from the rotation axis and the outflow chamber having at least one nozzle to eject liquid from the container, and*

(*iii*) *barrier wall means, within the separation chamber, comprising a barrier wall extending upwardly from the partition wall to terminate in a barrier wall edge and disposed radially inwardly of the peripheral side wall, to define with said peripheral side wall and partition wall a contaminant retention region, said barrier wall being inclined towards the peripheral side wall such that said barrier wall edge is spaced therefrom to form a radially restricted neck to the contaminant retention region at such inclination and spacing, when the rotor is spinning about the axis at at least a predetermined minimum speed, that non-cohesive contaminants deposited on the barrier wall by centrifugal separation force are caused by said force to flow from the barrier wall edge to the peripheral side wall, and, when the rotor is not spinning at at least side predetermined speed, to permit the separated non-cohesive contaminants deposited on the peripheral side wall to slump into said contaminant retention region and be inhibited from being entrained into liquid flowing between the inlet aperture and the transfer aperture.*

*16. The rotor as claimed in claim 15 in which the barrier wall means comprises at least one additional partition wall extending radially inwardly from the peripheral side wall and an additional barrier wall extending upwardly from said at least one additional partition wall and terminating in an additional barrier wall edge and disposed radially inwardly of the peripheral side wall, to define with said peripheral side wall and additional partition wall an additional contaminant retention region, said additional barrier wall being inclined towards the peripheral side wall such that said additional barrier wall edge is spaced therefrom to form a radially restricted neck to the additional contaminant retention region at such inclination and spacing, when the rotor is spinning about the axis at at least said predetermined minimum speed, that non-cohesive contaminants deposited on the additional barrier wall by centrifugal separation force are caused by said force to flow from the additional barrier wall edge to the peripheral side wall, and, when the rotor is not spinning at at least said predetermined speed, to permit the separated non-cohesive contaminants deposited on the peripheral side wall to slump into said additional contaminant retention region and be inhibited from being entrained into liquid flowing between the inlet aperture and the transfer aperture.*

*17. The rotor as claimed in claim 16 in which the barrier wall means further comprises a complementary barrier wall associated with said barrier wall or said additional barrier wall, and comprising a downwardly extending wall that, when the rotor is spinning about the axis at at least said predetermined minimum speed, is inclined towards the peripheral side wall and axially facing said barrier wall or said additional barrier wall whereby non-cohesive contaminants deposited on the complementary barrier wall by centrifugal force are caused by said force to flow to the peripheral side wall adjacent the neck of the contaminant retention region or additional contaminant retention region and, when the rotor is not spinning at at least said predetermined speed the non-cohesive contaminants are permitted to slump into said contaminant retention region or said additional contaminant retention region and inhibited by the neck from being entrained into liquid flowing between the inlet aperture and the transfer aperture.*

*18. The rotor as claimed in claim 17 in which the complementary barrier wall uppermost in the separation chamber is defined by the peripheral wall of the rotor container.*

*19. The rotor as claimed in claim 17 in which said complementary barrier wall has, when the rotor is not spinning at at least said predetermined minimum speed, a complementary barrier wall edge spaced axially from said barrier wall or said additional barrier wall edge by a gap.*

*20. The rotor as claimed in claim 19 in which the barrier wall means includes valve means arranged to be biased to substantially close the gap and responsive to radially outwardly directed centrifugal separation force to overcome said bias and open the gap.*

*21. The rotor as claimed in claim 20 in which said complementary barrier wall and said barrier wall or said additional barrier wall extends completely circumferentially of the axis and the valve means comprises a flap of flexible and impermeable material carried by the complementary barrier wall edge and arranged to abut the barrier wall edge or additional barrier wall edge absent said outwardly directed centrifugal separation force.*

*22. The rotor as claimed in claim 20, in which at least one of said barrier wall, said additional barrier wall or said complementary barrier wall comprises, in a circumferential direction about said axis, a plurality of discrete wall members, at least one of said discrete wall members having a wall edge normally biased into abutment with a cooperating facing wall member and radially deflectable by spinning of the rotor substantially at said predetermined speed.*

*23. The rotor as claimed in claim 16 in which the barrier wall means further comprises a complementary barrier wall associated with said barrier wall or said additional barrier wall, and comprising a downwardly extending wall that, when the rotor is spinning about the axis at at least said predetermined minimum speed, is inclined towards the*

*peripheral side wall and axially facing said barrier wall or said additional barrier wall whereby non-cohesive contaminants deposited on the complementary barrier wall by centrifugal force are caused by said force to flow to the peripheral side wall adjacent the neck of the contaminant retention region or additional contaminant retention region and, when the rotor is not spinning at at least said predetermined speed the non-cohesive contaminants are permitted to slump into said said contaminant retention region or said additional contaminant retention region and inhibited by the neck from being entrained into liquid flowing between the inlet aperture and the transfer aperture and at least one said complementary barrier wall extends from an additional partition wall.*

*24. The rotor as claimed in claim 15 in which the radially inwardly facing surface of at least one wall of the barrier wall means has baffle means arranged to encourage rotation of the liquid with the wall.*

*25. The rotor as claimed in claim 24 in which the baffle means comprises at least one radially extending embossment of the wall.*

*26. The rotor as claimed in claim 24 in which the baffle means comprises a flange secured to the surface of the wall.*

*27. The rotor as claimed in claim 25 in which said barrier wall means includes a plurality of discrete wall members arranged about the axis, said wall members being inclined with respect to each other in a circumferential direction to define at their junctions radially extending baffle means.*

*28. The rotor as claimed in claim 15 in which the barrier wall means is formed as a unitary sub-assembly, having at least a side wall, a partition wall, a supplementary partition wall and a barrier wall extending therefrom to define integrally therewith the contaminant retention region.*

*29. A rotor for a centrifugal separator, comprising:*

*a container having:*

*(i) an outer, peripheral wall including a peripheral side wall displaced from a longitudinal rotation axis of the rotor,*

*(ii) an internal partition wall extending radially inwardly from the peripheral wall dividing the container into a separation chamber and an outflow chamber and defining at a radial inner periphery a transfer aperture between the separation and outflow chambers, the separation chamber including an inlet aperture and the outflow chamber having at least one ejection nozzle, and*

*(iii) a barrier wall assembly, within the separation chamber, comprising a barrier wall extending upwardly from the partition wall to terminate in a barrier wall edge and disposed radially inwardly of the peripheral side wall, to define with said peripheral side wall and partition wall a contaminant retention region, said barrier wall being inclined towards the peripheral side wall such that said barrier wall edge is spaced therefrom to form a radially restricted neck to the contaminant retention region.*

*30. The rotor as claimed in claim 29 in which the barrier wall assembly comprises at least one additional partition wall extending radially inwardly from the peripheral side wall and an additional barrier wall extending upwardly from said at least one additional partition wall and terminating in an additional barrier wall edge and disposed radially inwardly of the peripheral side wall, to define with said peripheral side wall and additional partition wall an additional contaminant retention region, the additional barrier wall being inclined towards the peripheral side wall such that said additional barrier wall edge is spaced therefrom to form a radially restricted neck to the additional contaminant retention region.*

*31. The rotor as claimed in claim 30 in which the barrier wall assembly further comprises a complementary barrier wall associated with said barrier wall or said additional barrier wall and comprising a downwardly extending wall that is inclined towards the peripheral side wall and axially facing said barrier wall or said additional barrier wall.*

*32. The rotor as claimed in claim 31 in which the complementary barrier wall uppermost in the separation chamber is defined by the peripheral wall of the rotor container.*

*33. The rotor as claimed in claim 31 in which said complementary barrier wall has a complementary barrier wall edge spaced axially from said barrier wall or said additional barrier wall edge by a gap.*

*34. The rotor as claimed in claim 33 in which the barrier wall assembly includes a valve arranged to be biased to substantially close the gap and responsive to radially outwardly directed centrifugal separation force to overcome said bias and open the gap.*

*35. The rotor as claimed in claim 34 in which said complementary barrier wall and said barrier wall or said additional barrier wall extends completely circumferentially of the axis and the valve comprises a flap of flexible and impermeable material carried by the complementary barrier wall edge and arranged to abut the barrier wall edge or additional barrier wall edge absent said outwardly directed centrifugal separation force.*

*36. The rotor as claimed in claim 34, in which at least one of said barrier wall, said additional barrier wall or said complementary barrier wall comprises, in a circumferential direction about said axis, a plurality of discrete wall members, at least one of said discrete wall members having a wall edge normally biased into abutment with a cooperating facing wall member and radially deflectable by spinning of the rotor substantially at said predetermined speed.*

*37. The rotor as claimed in claim 30 in which the barrier wall assembly further comprises a complementary barrier wall associated with said barrier wall or said additional barrier wall and comprising a downwardly extending wall that is inclined towards the peripheral side wall and axially facing said barrier wall or said additional barrier wall and the complementary barrier wall extends from an additional partition wall.*

*38. The rotor as claimed in claim 29 in which the radially inwardly facing surface of at least one wall of the barrier wall assembly has a baffle.*

*39. The rotor as claimed in claim 38 in which the baffle comprises at least one radially extending embossment of the wall.*

*40. The rotor as claimed in claim 38 in which the baffle comprises a flange secured to the surface of the wall.*

*41. The rotor as claimed in claim 39 in which said barrier wall assembly includes a plurality of discrete wall members arranged about the axis, said wall members being inclined with respect to each other in a circumferential direction to define at their junctions a radially extending baffle.*

*42. The rotor as claimed in claim 29 in which the barrier wall assembly is formed as a unitary sub-assembly, having at least a side wall, a partition wall, a supplementary partition wall and a barrier wall extending therefrom to define integrally therewith the contaminant retention region.*

* * * * *